Oct. 24, 1967    J. L. MARTIN ET AL    3,348,821
HUMIDIFIER
Filed Nov. 23, 1965
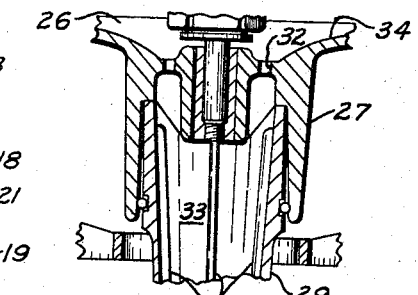
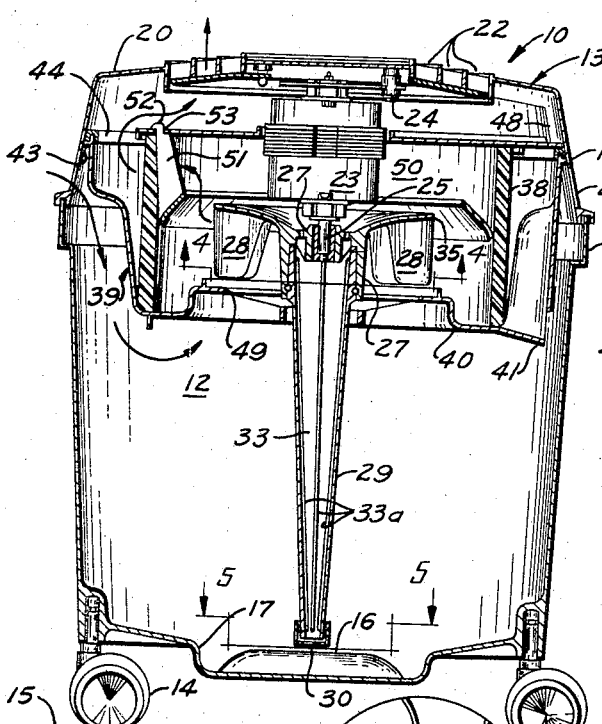
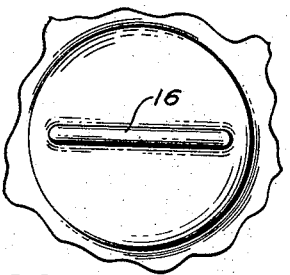
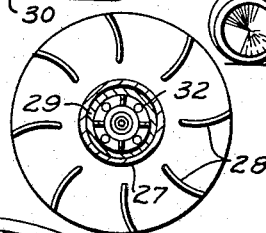
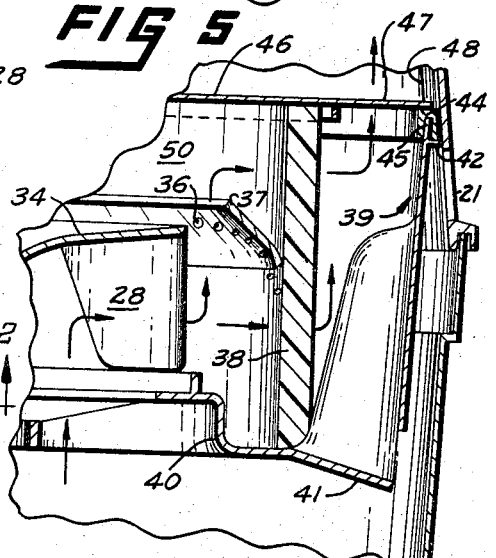
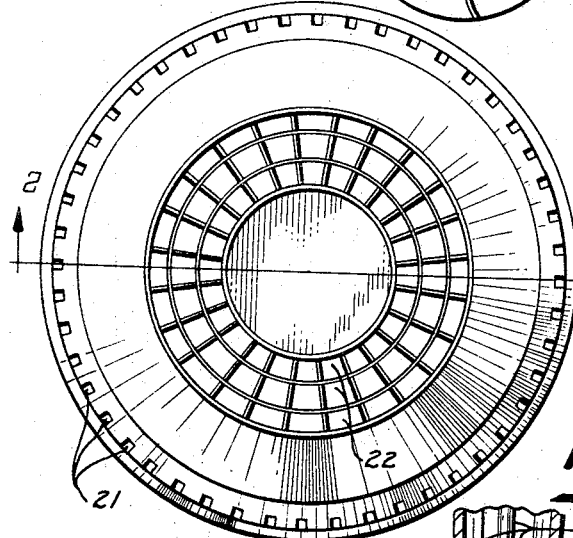
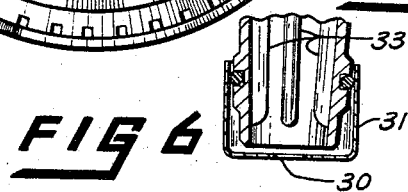
INVENTOR
JOHN L. MARTIN
RUSSELL M. AMUNDSEN
BY
Francis L. Snyder
Agent

United States Patent Office 3,348,821
Patented Oct. 24, 1967

3,348,821
HUMIDIFIER
John L. Martin and Russell M. Amundsen, St. Joseph, Mich., assignors to Whirlpool Corporation, a corporation of Delaware
Filed Nov. 23, 1965, Ser. No. 509,310
4 Claims. (Cl. 261—29)

This invention relates to a humidifier and specifically to improvements in a humidifier which disperses liquid vapor to a space to be humidified.

In a humidifier of the type shown in the copending patent application of Laddie A. DePas, Ser. No. 388,536, filed Aug. 10, 1964, now Patent No. 3,282,574 and assigned to a common assignee, the amount of liquid vapor imparted to a space to be humidified depends primarily upon liquid droplet surface area available, rate of air flow across the droplet surface area and the exposure time of the droplet to the air flow. However, there are practical limitations to the magnitude of both droplet size and air flow rate. Therefore, it is desirable to increase the liquid surface area exposed to the air flow without increasing droplet size or the air flow rate.

The instant invention employs an improved method and apparatus for imparting substantially impurity-free humidified air to a room by dispersing liquid containing impurities in the form of droplets across an air passage with a spinning disc arrangement, and flowing air from the room into contact with the droplets to partially evaporate the droplets until the droplets with the impurities therein strike a porous means, such as a foam ring, for intercepting, absorbing and returning the unevaporated portion of the liquid to the liquid source in a substantially noise-free manner. Also, a portion of the air flow is directed through the porous ring to evaporate more of the liquid during its return to the liquid source via the porous ring. This increases the total liquid surface area contacted by the air flow.

Also, the humidifying apparatus of this application provides wall means for substantially confining noise generated by the motor and liquid droplets impinging on a hard surface so that the noise detected by the human ear will be reduced.

Therefore, it is an object of this invention to provide a humidified air stream which is free of liquid droplets, solids and impurities, and substantially free of dust, to a space to be humidified.

A feature of the invention resides in the porous means for substantially noise-free interception, absorption and return of the impurity-laded liquid droplets to the reservoir of the humidifying apparatus.

Another feature of the invention resides in the separation by the porous means of liquid droplets from the humidified air stream which may become entrained in the air stream during humidification.

Still another feature of the invention resides in the method and apparatus for only partially evaporating the liquid droplets containing the impurities while retaining the impurities within the partially evaporated liquid droplets, intercepting the unevaporated droplets, absorbing the unevaporated liquid and again partially evaporating the unevaporated liquid during its return to the liquid reservoir of the humidifying apparatus.

A still further feature of the invention resides in the method of humidifying the air to be humidified without entraining impurities of the humidifying liquid into the humidified air and of filtering substantial quantities of dust from the air.

Other features and advantages of the invention will be apparent from the following description of one embodiment thereof taken in conjunction with the accompanying drawings, in which:

FIGURE 1 is a top plan view of the humidifying apparatus embodying the invention;
FIGURE 2 is a sectional view taken substantially along line 2—2 of FIGURE 1;
FIGURE 3 is an enlarged broken away portion of FIGURE 2 showing the liquid droplets traversing the air passage;
FIGURE 4 is a bottom view of air translation means taken substantially along line 4—4 of FIGURE 2;
FIGURE 5 is a fragmentary view taken substantially along line 5—5 of FIGURE 2;
FIGURE 6 is a fragmentary view of the bottom portion of the elongate hollow tube; and
FIGURE 7 is an enlarged fragmentary sectional view showing the top portion of the elongate hollow tube and hub portion of the spinning disc of FIGURE 2.

In the exemplary embodiment of the invention disclosed in the drawings, the humidifying apparatus generally designated as 10 is shown to comprise a liquid reservoir 11 for containing a liquid, such as tap water, having natural impurities therein and a removable cover 13 to define an enclosed chamber 12. The natural impurities of the liquid may be minerals such as calcium, iron, magnesium, sodium and potassium. Particles of dust may also make up a portion of the impurities of the liquid.

Liquid reservoir 11 is supported by casters 14 on a surface such as a floor or a table top 15. An anti-swirl vane 16, as shown in FIGURES 2 and 5, is located on the inner bottom surface 17 of liquid reservoir 11. Vane 16 is positioned at the centerline of the bottom surface 17 to reduce the tendency of the liquid to swirl in liquid reservoir 11. Swirling of the liquid in reservoir 11 is objectionable because it causes noisy operation of the humidifier and also hinders the liquid pumping operation.

Cover 13 has an angular portion 18 which cooperates with upper rim 19 of reservoir 11. The top portion 20 of cover 13 is connected to and is integral with the angular portion 18. Angular portion 18 has a plurality of air inlet openings 21 therein spaced apart around the entire circumference thereof, to provide for intake of air from the room to be humidified (see FIGURE 1). Air outlet openings 22 are located in top portion 20 of cover 13 and completely surround a motor 23 (see FIGURE 2). Openings 22 provide for the flow of humidified air around motor 23 to cool motor 23 as well as for exhaust of humidified air to the room, as will be described hereinafter.

Motor 23 is attached to the top portion 20 of cover 13 by a plurality of conventional mounting means 24. Motor 23 includes a drive shaft 25 which is rotated upon energization of motor 23. A disc 26 has an integral hub portion 27 which is connected to shaft 25 for rotation of disc 26 upon energization of motor 23. A plurality of curved blower blades 28, which are located beneath disc 26 and are integral therewith, cause movement of air through humidifying apparatus 10. An elongate hollow tube 29 is associated with hub 27 and has a passage 33 extending throughout its length. Tube 29 extends downwardly from hub 27 into liquid reservoir 11 and below the liquid level. A liquid inlet opening 30 is located in the bottom portion 31 which is suitably connected to tube 29, as shown in FIGURE 6. A plurality of liquid outlet passages 32, FIGURE 7, are located in hub 27 and communicate with passage 33 of tube 29. Vanes 33A extend radially inwardly from tube 29 into passage 33 from the inner surface of tube 29.

During rotation of shaft 25, disc 26 and tube 29, liquid is pumped upwardly from reservoir 11 by centrifugal force and by vanes 33A, in the well-known manner, through passage 33 of tube 29 and through passages 32 where it is centrifugally distributed evenly across the upper surface 34 of disc 26. The rotation of disc 26 causes the liquid to be thrown or slung outwardly from the entire outer periphery 35 of disc 26 in the form of droplets 36. Droplets 36 travel from disc 26 across an annular air passage to a deflector arrangement 37 where droplets 36 are deflected against an annular porous means 38, for example, a flexible foam ring, from where the liquid flows downward to a collector arrangement 39 and is returned to reservoir 11. The annular air passage is defined by outer periphery 35 of disc 26 and deflector 37. Deflector 37 has a plurality of arms 51 that cooperate with disc 46 to support deflector 37. The hook portion 52 of arm 51 snaps into slot 53 in disc 46 to secure deflector 37 to disc 46.

Collector arrangement 39 comprises an annular collector tray portion 40 and a liquid return lip 41, as shown in FIGURE 3. Collector arrangement 39 has at its top portion an outwardly turned flange 42 which cooperates with a plurality of projections 43 located on the inner surface of angular portion 18 for attaching collector arrangement 39 to cover 13, intermediate air inlet openings 21 and air outlet openings 22, as shown in FIGURE 1. The cooperation of collector arrangement 39 with cover 13 and reservoir 11 defines an air passage from air inlet openings 21 into chamber 12 and through opening 49 to air outlet openings 22. An inverted U-shaped gasket 44 cooperates with the upper annular edge 45 of collector arrangement 39 to establish a seal between the collector arrangement 39 and the inside surface of inclined wall portion 18. A disc-shaped baffle 46 having web portions 47 is located above disc 26 and around motor 23. Web portions 47 cooperate wtih gasket 44 and a stiffening rib 48, which is located on the inner surface of wall portions 20 and 18, to position and hold disc-shaped baffle 46. Droplets, such as 36, which are slung from disc 26 are thrown against deflector arrangement 37, deflected to porous means 38 for noiseless interception and flow downward to collector tray 40 for return to reservoir 11 through return lip 41. Therefore, the impact of each droplet is not only dampened by the annular porous means 38, but any noise caused by disc 26 and droplets impinging on deflector 37 is confined within annular porous means 38 and baffle 46.

OPERATION

When motor 23 is energized, liquid from reservoir 11 is pumped into opening 30 and upwardly through passage 33 of tube 29 by centrifugal action imparted to the liquid by vanes 33A upon rotation of tube 29. The liquid then flows from passage 33 through passages 32 in hub 27 for distribution on the upper surface 34 of disc 26. The liquid is then slung from the full outer periphery 35 of disc 26 in the form of droplets across an annular air passage defined by the outer periphery 35 of disc 26 and deflector 37, to deflector 37 where the liquid droplets are directed to porous means 38. Porous means 38 absorbs the droplets and directs the liquid to collector tray 40 to be returned to reservoir 11. Simultaneously, the rotation of blower blades 28 draws air through inlet openings 21, around collector arrangement 39 into chamber 12 and through opening 49 to blower blades 28 and thence through the annular passage between outer periphery 35 and deflector 37 where it comes in contact with droplets 36 to absorb moisture therefrom, to an area 50 above deflector 37, through the upper portion of ring 38 where any air-borne droplets are removed from the humidified air and around disc 46. The humidified air is then exhausted through outlet openings 22. As the air passes through the annular passage, liquid droplets 36 are partially evaporated into the air stream, humidifying the air. However, since the impurities are heavier they stay with the unevaporated portion of droplet 36 and are returned to reservoir 11 with the unevaporated portion of droplet 36 via the lower portion of ring 38 and lip 41 of collector arrangement 39. A portion of the air flow is forced outwardly through the lower portion of foam ring 38. This air is humidified by partially evaporating the liquid on the many surfaces provided by foam ring 38 which greatly increases the efficiency of the humidifier.

Droplets 36 are so numerous that they provide a water curtain substantially across the annular passage. This partial water curtain serves not only to humidify the air, but also to wash dust particles from the air stream to provide substantially dust-free humified air returning to the room.

Since the vapor pressure of the impurities in the liquid, compared to that of the liquid, is substantially non-existent at a room temperature of approximately 70° F., the impurities will not separate from the droplets during partial evaporation thereof. Therefore, the room is humidified with only impurity-free liquid vapor.

Having described our invention as related to the embodiment shown in the accompanying drawings, it is our intention that the invention be not limited by any of the details of description unless otherwise specified, but rather be construed broadly in spirit and scope as set out in the accompanying claims.

The embodiment of the invention in which an exclusive property or privilege is claimed is defined as follows:

1. Air humidifying apparatus, comprising:
container means for containing a liquid having impurities therein and defining an enclosed chamber having air inlet and air outlet means;
wall means intermediate said air inlet and outlet means for defining an air passage therebetween;
liquid translation means having drive means, said liquid translation means being positioned in said air passage and in communication with liquid in said container means for distribution of said liquid across said air passage;
air translation means operatively connected to said liquid translation means, said air translation means being positioned in said air passage for flowing air from a space to be humidified through said inlet means and said air passage for humidification thereof by partial evaporation of said liquid in said air passage, and for transfer of humidified air from said air passage through said air outlet means to said space, upon operation of said drive means;
impervious deflector means extending at an acute angle to a horizontal plane positioned in spaced adjacent relationship to said liquid translation means to receive and deflect liquid therefrom, said air translation means directing air flow above and below said deflector means; and a flexible foam cylinder positioned in said air passage in contact with said wall means, and surrounding said liquid translation means and said impervious deflector means, said deflector means dividing said foam cylinder into an upper portion and a lower portion, said air translation means directing a first quantity of air from said inlet means above said deflector means and through said upper portion of the foam cylinder while directing the remaining quantity of air from said inlet means below said deflector means and through said lower portion of said foam cylinder.

2. Air humidifying apparatus as claimed in claim 1, in which said wall means and said foam cylinder defines a chamber which isolates said deflector means and said liquid translation means from said outlet means to confine noise in said chamber caused by said liquid impinging on said deflector means.

3. Air humidifying apparatus as claimed in claim 1 in which the air translation means is positioned substantially below the deflector means.

4. Air humidifying apparatus as claimed in claim 1 in which said wall means includes a liquid collector arrangement in sealing engagement with said container means, and a baffle means which cooperates with said collector arrangement, said foam cylinder extending from said collector arrangement to said baffle means.

(References on following page)

References Cited

UNITED STATES PATENTS

| | | | |
|---|---|---|---|
| 1,766,643 | 6/1930 | Janes | 261—91 |
| 1,864,797 | 6/1932 | Braemer | 261—91 |
| 1,955,518 | 4/1934 | Sherwood | 261—91 |
| 2,218,198 | 10/1940 | Harris | 261—91 X |
| 2,377,836 | 6/1945 | Woolery | 261—91 X |
| 3,005,591 | 10/1961 | Bradley. | |
| 3,110,748 | 11/1963 | Myklebust | 261—29 |
| 3,130,245 | 4/1964 | Banks | 261—91 X |
| 3,220,707 | 11/1965 | Weatherston et al. | 261—91 X |

FOREIGN PATENTS 542,709  11/1955  Belgium.

HARRY B. THORNTON, *Primary Examiner.*
RONALD R. WEAVER, *Examiner.*